(12) United States Patent
Takasu

(10) Patent No.: US 7,773,037 B2
(45) Date of Patent: Aug. 10, 2010

(54) INFORMATION PROCESSING APPARATUS, INFORMATION PROCESSING SYSTEM AND RADIO COMMUNICATION CONTROL METHOD

(75) Inventor: Nobuaki Takasu, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 783 days.

(21) Appl. No.: 11/602,741

(22) Filed: Nov. 21, 2006

(65) Prior Publication Data
US 2007/0120752 A1   May 31, 2007

(30) Foreign Application Priority Data
Nov. 30, 2005   (JP) .............................. 2005-345378

(51) Int. Cl.
*H01Q 1/24* (2006.01)
(52) U.S. Cl. ...................................... 343/702; 343/876
(58) Field of Classification Search ................. 343/702, 343/906, 876
See application file for complete search history.

(56) References Cited

U.S. PATENT DOCUMENTS

| 5,864,708 | A | 1/1999 | Croft et al. |
| 6,118,408 | A * | 9/2000 | Yang et al. ................... 343/702 |
| 6,208,300 | B1 * | 3/2001 | Johnson ....................... 343/702 |
| 2003/0063592 | A1 * | 4/2003 | Seki et al. .................... 370/338 |
| 2004/0066308 | A1 * | 4/2004 | Sampsell ............... 340/825.69 |
| 2004/0073321 | A1 * | 4/2004 | Kondo .......................... 700/28 |
| 2004/0152953 | A1 * | 8/2004 | Goedeke ..................... 600/300 |
| 2007/0162623 | A1 * | 7/2007 | Kondo .......................... 710/2 |

FOREIGN PATENT DOCUMENTS

| JP | 10-55231 | 2/1998 |
| JP | 2000-194444 | 7/2000 |
| JP | 2004-513732 | 5/2004 |

* cited by examiner

*Primary Examiner*—HoangAnh T Le
(74) *Attorney, Agent, or Firm*—Knobbe Martens Olson & Bear LLP

(57) ABSTRACT

According to one embodiment, an information processing apparatus including a main body to be detachably docked with an external apparatus including a first antenna and a first radio communication unit which performs radio communication by using the first antenna, a second antenna provided in the main body, a third antenna provided in a predetermined position in the main body, which is closer to the first antenna than to the second antenna, when the main body is docked with the external apparatus, and a second radio communication unit which is provided in the main body, and communicates by radio with the external apparatus by using the third antenna, when the main body is docked with the external apparatus.

8 Claims, 8 Drawing Sheets

INFORMATION PROCESSING APPARATUS, INFORMATION PROCESSING SYSTEM AND RADIO COMMUNICATION CONTROL METHOD

CROSS-REFERENCE TO RELATED APPLICATIONS

This application is based upon and claims the benefit of priority from Japanese Patent Application No. 2005-345378, filed Nov. 30, 2005, the entire contents of which are incorporated herein by reference.

BACKGROUND

1. Field

One embodiment of the present invention relates to an information processing apparatus provided with a main body which can be docked with an external apparatus, and in particular an information processing apparatus having a function of communicating with the external apparatus by radio, an information processing system also having the function, and a radio communication control method for the information processing apparatus and the system.

2. Description of the Related Art

In recent years, various kinds of portable information processing apparatuses such as notebook computers have been developed. Of those computers, some are formed such that they can be docked with an external apparatus in order to expand their functions. The external apparatus permits an option device, which can be controlled by the computer docked with the external apparatus, to be connected to the external apparatus.

In such a system, the functions of the option device connected to the external apparatus can be utilized simply by connecting the computer to the external apparatus. Accordingly, the user does not need to attach the option device to the computer, and the space for the system is not increased, since it is not necessary to use cables or the like to connect the computer to the external apparatus.

Jpn. Pat. Appln. KOKAI Publication No. 10-55231 discloses a technique in which a portable computer is placed adjacent to a docking station to communicate with the docking station (by using an infrared signal, an optical fiber or a radio signal)

In general, a computer sends a radio signal over a wide range to communicate by radio with a desired device located apart from the computer by a predetermined distance. Therefore, when the computer communicates by radio with an external apparatus connected to the computer, it also outputs a radio signal over a wide range. Therefore, there is a possibility that power for the radio communication may be wastefully consumed. Furthermore, if a number of radio communication apparatuses are present, there is a possibility that communication channels cannot be allocated to all the radio communication apparatuses. In addition, since the radio signal is transmitted over a wider range than is necessary, there is a risk that information carried by the radio signal may be intercepted.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Various embodiments according to the invention will be described hereinafter with reference to the accompanying drawings. In general, according to one embodiment of the invention, an information processing apparatus according to the present invention comprises: a main body to be detachably docked with an external apparatus including a first antenna and a first radio communication section which performs radio communication by using the first antenna; a second antenna provided in the main body; a third antenna provided in a predetermined position in the main body, which is closer to the first antenna than to the second antenna, when the main body is docked with the external apparatus; and a second radio communication section which is provided in the main body to perform radio communication by using the second antenna or the third antenna, and which communicates by radio with the external apparatus by using the third antenna, when the main body is docked with the docking station.

An embodiment of the present invention will be explained with reference to the accompanying drawings.

Figure 1:
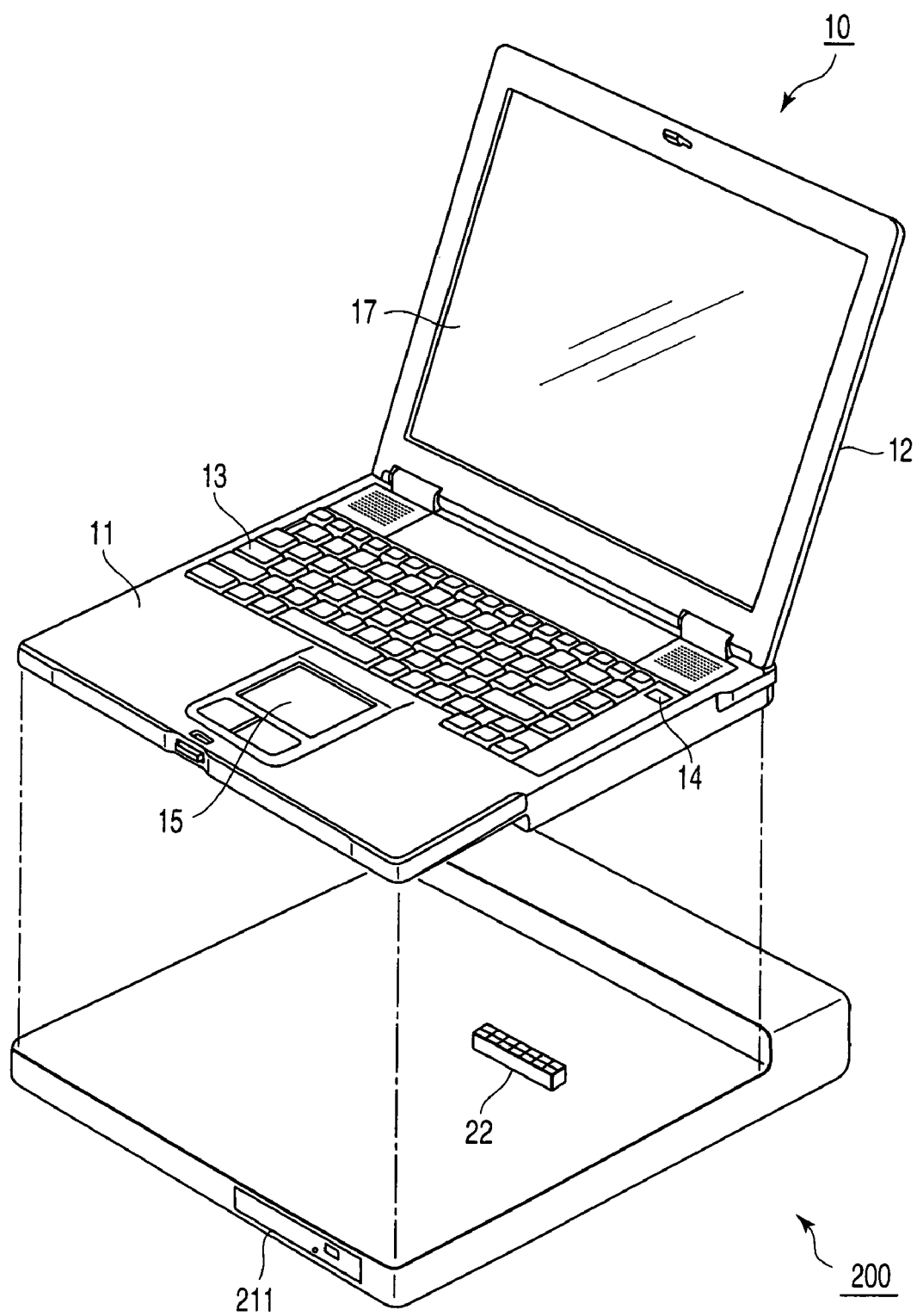
FIG. 1 is a perspective view showing external appearances of an information processing apparatus according to a first embodiment of the present invention and an external apparatus with which the information processing apparatus can be docked.

First of all, a first embodiment of the present invention will be explained with reference to FIGS. 1 to 4. FIG. 1 shows the structure of an information processing apparatus according to the first embodiment. The information processing apparatus is provided as, e.g., a portable notebook computer 10 which can be driven by a battery. The portable notebook computer 10 can be docked with a docking station 200 serving as the external apparatus. The docking station 200 functions as an expansion unit for expanding the function of the computer 10. Also, the docking station 200 has a function of supplying power to the computer 10, when the computer 10 is docked with the docking station 200. In the first embodiment, communication between the computer 10 and the docking station 200 is carried out as radio communication.

The main body of the computer 10 comprises a base portion 11 and a display unit 12. The display unit 12 incorporates a display unit comprising a liquid crystal display (LCD) 17. A display screen of the LCD 17 is located at substantially the center of the display unit 12. At a bottom of the computer 10, a connector is provided, and connectable to a docking interface connector 22 of the external apparatus, i.e., the docking station 200. In the main body of the computer 10, an antenna for radio communication with various kinds of external radio communication devices and a specific antenna for radio communication with the docking station 200 are provided.

The display unit 12 is supported by the base portion 11. To be more specific, it is attached to the base portion 11 in such a manner as to be rotatable between an open position in which it does not cover upper surface of the base portion 11, i.e., the upper surface of the base portion is exposed, and an closed position in which it covers the upper surface of the base portion 11. The base portion 11 has a thin box-shaped housing, and a keyboard 13, the power SW 14 for turning on/off the computer 10 and a touch pad 15 are provided on an upper surface of the base portion 11.

The docking station 200 has a thin boxed-shaped housing. In the housing of the docking station 200, an optical disk drive (ODD) 211 is provided. The ODD 211 is a drive unit for driving a recording medium such as a DVD or a CD which stores video contents or audio contents. Furthermore, the docking station 200 includes a plurality of ports to which various option devices can be connected.

In the case where the computer 10 (base portion 11) is docked with the docking station 200 by using the docking interface connector 22, power is supplied from, e.g., an AC adapter connected to the docking station 200, through the docking interface connector 22. The user can utilize an option device or devices connected to the docking station 200, and cause power from the docking station 200 to be supplied to the computer 10, simply by docking the computer 10 with the docking station 200.

Figure 2:
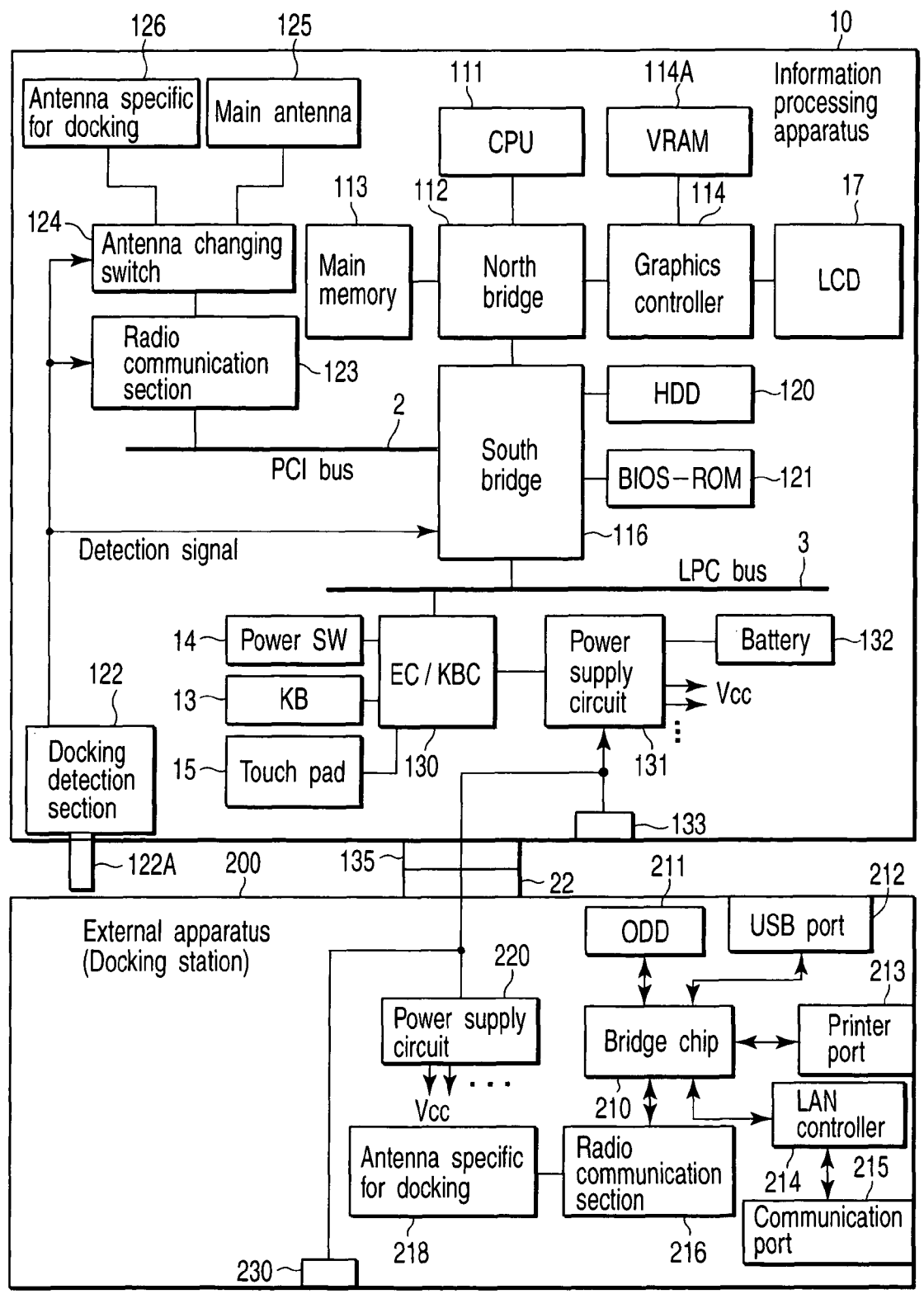
FIG. 2 is a block diagram showing an example of the system configuration of the information processing apparatus and external apparatus shown in FIG. 1.

FIG. 2 shows an example of the system configuration of each of the computer 10 and the docking station 200.

The computer 10, as shown in FIG. 2, comprises a CPU 111, a North bridge 112, a main memory 113, a graphics controller 114, a video memory (VRAM) 114A, a South bridge 116, a hard disk drive (HDD) 120, a BIOS-ROM 121, a docking detection section 122, a radio communication section 123, and an embedded controller/keyboard controller IC (EC/KBC) 130, etc.

To be more specific, the CPU 111 is a processor which controls the operations of components of the computer 10. The CPU 111 executes an operating system (OS) or an application program loaded from the HDD 120 into the main memory 113. As the application program to be executed, various kinds of application programs can be applied. Furthermore, the CPU 11 also executes a system Basic Input Output System (BIOS), which is a program for controlling hardware.

The North bridge 112 is a bridge device which connects a local bus of the CPU 111 and the South bridge 116. Also, the North bridge 112 has a function of communicating with the graphic controller 114 via an accelerated graphics port (AGP) bus.

The graphics controller 114 is a display controller which controls an LCD 17 serving as a display monitor of the computer 10. The graphics controller 114 includes the video memory (VRAM) 114A, and produces a display signal to be sent to the LCD 17, from video data written to the VRAM 114A.

The South Bridge 116 is Connected to a peripheral component interconnect (PCI) bus 2 and a low pin count (LPC) bus 3. To the PCI bus 2, the radio communication section 123 is connected. To the LPC bus 3, the EC/KBC 130 is connected. Furthermore, the South bridge 116 is provided with an integrate derive electronics (IDE) controller for controlling the HDD 120.

The radio communication section 123 functions as a radio communication module which performs radio communication by using the main antenna 125 or the antenna 126 specific for docking. The main antenna 125 is an antenna for use in radio communication with an external radio communication apparatus. The antenna 126 is an antenna specific for radio communication with the docking station 200.

The radio communication section 123 performs a radio signal limiting processing for limiting the strength (field strength) of a radio signal to be transmitted from the antenna 126 specific for docking, in response to a detection signal from the docking detection section 122. To be more specific, the radio communication section 123 supplies power, which is smaller than power to be supplied to the main antenna 125, to the antenna 126. As a result, the strength of the radio signal output from the antenna 126 is smaller than that of a radio signal from the main antenna. To the radio communication section 123, an antenna changing switch 124 is connected.

To the antenna changing switch 124, the antenna 126 specific for docking and the main antenna 125 are connected. The antenna changing switch 124 selectively connects the antenna 126 and the main antenna 125 to the radio communication section 123 in accordance with whether the detection signal is output from the docking detection section 122 or not. To be more specific, when receiving the detection signal from the docking detection section 122, the antenna changing switch 124 switches the antenna to be connected to the radio communication section 123 from the main antenna 125 to the antenna 126 specific for docking, thereby connecting the antenna 126 to the radio communication section 123. When transmission of the detection signal from the docking detection section 122 is stopped, the antenna changing switch 124 switches the antenna to be connected to the radio communication section 123 from the antenna 126 to the main antenna 125, thereby connecting the main antenna 125 to the radio communication section 123.

At the docking detection section 122, for example, a microswitch 122A is provided. The microswitch 122A is provided at a bottom of the base portion 11 of the computer 10. When the computer 10 is docked with the docking station 200, the microswitch 122A is pressed. As a result, the docking detection section 122 generates the detection signal as a signal indicating that the computer 10 has been docked with the docking station 200. Then, the docking detection section 122 transmits the detection signal to each of the antenna changing switch 124, the radio communication section 123 and the South bridge 116. The detection signal transmitted to the South bridge 116 is sent to the CPU 111. While the microswitch 122A is kept pressed, the docking detection section 122 continuously transmits the detection signal to each of the antenna changing switch 124, the radio communication section 123 and the South bridge 116.

The EC/KBC 130 is a one-chip microcomputer wherein an embedded controller for power control is formed integral with a keyboard controller for controlling the keyboard (KB) 13 and the touch pad 1. The EC/KBC 130 powers up the computer 10 in cooperation with a power supply circuit 131, when the power SW 14 is pressed by the user. The power supply circuit 131 supplies power Vcc to components of the computer 10. More specifically, the power supply circuit 131 selectively uses power from the battery 131 and that from an external power supply (AC adapter which is connected an external power supply connection terminal 133 of the docking station 200, as occasion demands), which is supplied from the docking station 200, thereby generating the power Vcc.

The docking station 200 comprises a bridge chip 210, the ODD 211, a universal serial bus (USB) port 212, a printer port 213, a local area network (LAN) controller 214, a communication port 215, a radio communication section 216, an antenna 218 specific for docking, and a power supply circuit 220, etc.

The bridge chip 210 is, e.g., a one-chip microcomputer which serves as a controller for controlling all the ODD 211, the USB port 212, the printer port 213, the LAN controller 214 and the radio communication section 216, etc., which are connected to the bridge chip 210. The bridge chip 210 communicates by radio with the computer 10 by using the radio communication section 216. For example, when receiving a request for access to data stored in a storage medium inserted into the ODD 211, through radio communication, from the computer 10, the bridge chip 210 reads the data to be accessed, from the storage medium, and sends the data to the radio communication section 216. The radio communication section 216 sends the data to the computer 10.

The USB port 212 is a connection terminal to which a device complying with the USB standard, i.e., a USB-compliant device can be connected. The LAN controller 214 is connected to a communication port 215 to which, e.g., a communication cable complying with the LAN standard can be connected. The LAN controller 214 communicates with an external device through a LAN cable connected to the communication port 215.

The radio communication section 216 is connected to the antenna 218 specific for docking, and communicates by radio with the computer 10 by using the antenna 218.

The power supply circuit 220 generates the power Vcc by using power from the external power supply (AC adapter which is connected to the external power supply connection terminal 230 as occasion demands), and supplies the generated power VCC to components of the docking station 200.

When the computer 10 is docked with the docking station 200, power is supplied from the external power supply (external power supply connection terminal 230) to the power supply circuit 131 through the docking interface connector 22 provided at the docking station 200 and a connector 135 provided at the computer 10.

Also, when the computer 10 is docked with the docking station 200, they communicate with each other by radio. Due to this radio communication, for example, the computer 10 can acquire the data from the storage medium inserted in the ODD 211 of the docking station 200. Also, it can utilize an option device or devices (such as a USB-compliant device and a printer) connected to the ports provided at the docking station 200 and their cable communication functions.

Figure 3:
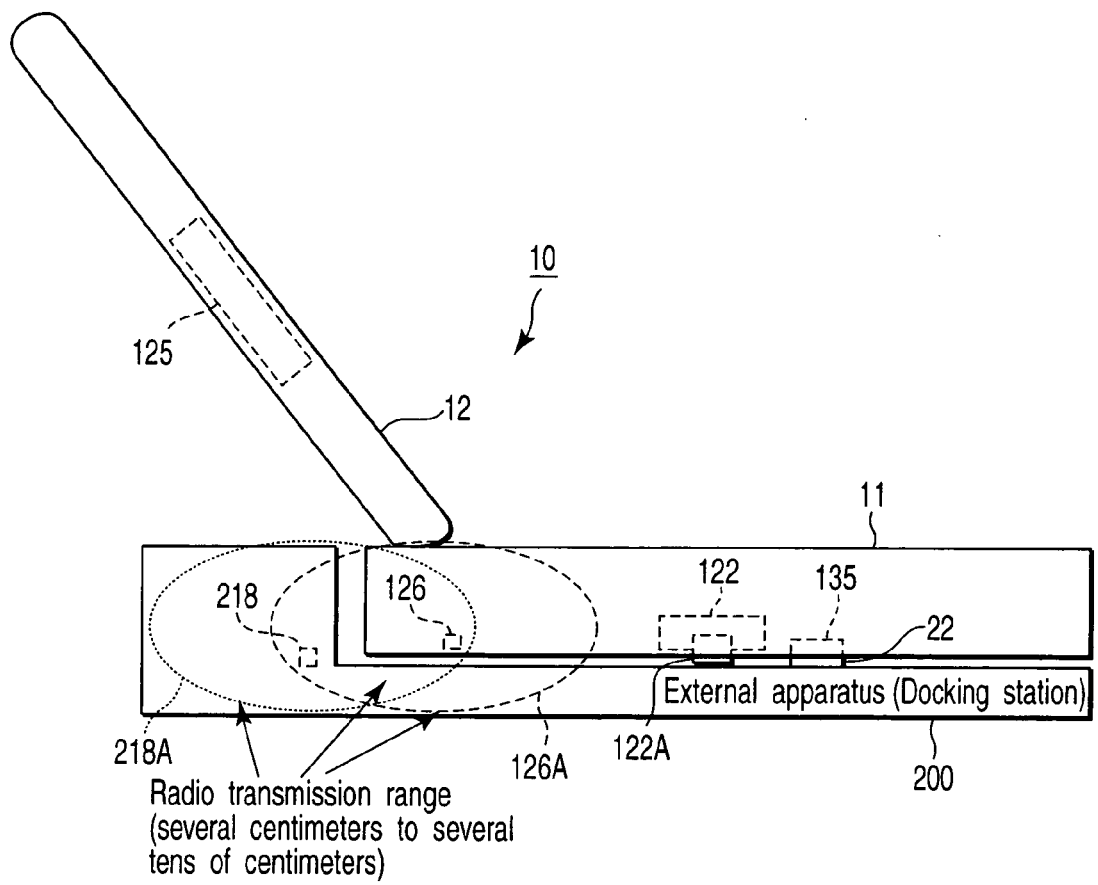
FIG. 3 is a vertical sectional view for use in explaining the positions of antennas respectively provided in the information processing apparatus and external apparatus shown in FIG. 1, and the ranges of transmission of radio signals output from the antennas.

Next, a first example of the positions of the antennas provided at the docking station 200 and the computer 10 will be explained with reference to FIG. 3. FIG. 3 is a side view of each of the computer 10 and the docking station 200 which are docked with each other.

In the first example, the main antenna 125 is provided in the display unit 12 of the computer 10, and the antenna 125 specific for docking is provided in the base portion 11. In the docking station 200, the antenna 218 specific for docking is provided.

The antenna 126 specific for docking is located in a predetermined position in the base portion 11, which is closer to the antenna 218 in the docking station 200 than to the main antenna 125, when the computer 10 is docked with the docking station 200.

At the bottom of the base portion 11 of the computer 10, the microswitch 122A and the connector 135 to be connected to the docking interface connector 22 are provided. When the connector 135 and the docking interface connector 22 are connected to each other, the microswitch 122A is pressed. As a result, the docking detection section 122 sends the detection signal to each of the radio communication section 123, the antenna changing switch 124 and the CPU 111 in the computer 10. When receiving the detection signal, the radio communication section 123 or the CPU 111 executes the above radio signal limiting processing. Also, when receiving the detection signal, the antenna changing switch 124 switches the antenna for use in radio communication from the main switch 125 to the antenna 126 specific for docking.

Due to the radio signal limiting processing, the range of transmission of the radio signal output from the antenna 126 specific for docking is limited to a radio transmission range 126A as shown in FIG. 3. The transmission range 126A is a minimum range in which a radio wave from the antenna 126 reaches the antenna 218 specific for docking.

Also, the range of transmission of the radio signal output from the antenna 218 specific for docking is limited to a radio transmission range 218A as shown in FIG. 3.

It should be noted that the antenna 126 specific for docking may be formed of an element smaller than that of the main antenna 125. In this case also,. the range of transmission of the radio signal output from the antenna 126 is limited to the radio transmission range 126A.

Figure 4:
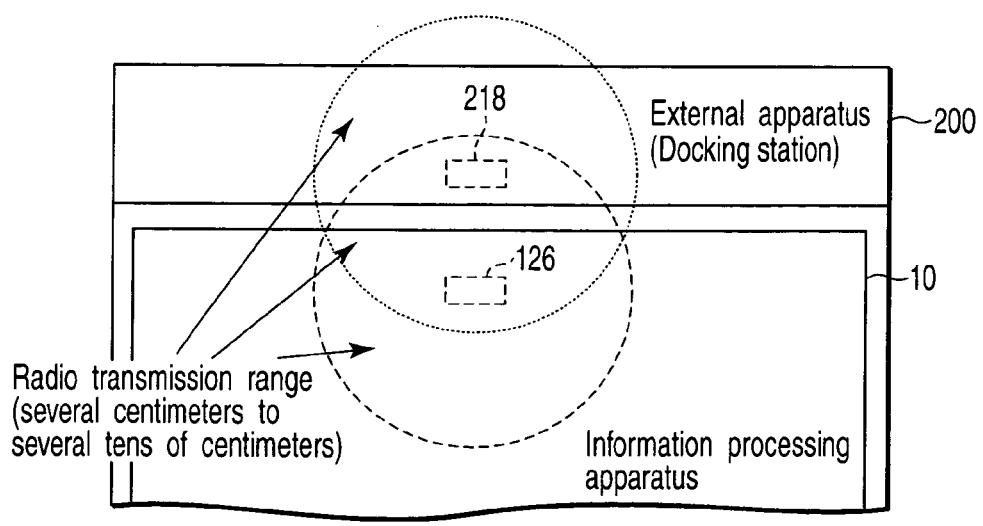
FIG. 4 is a top view showing the computer 10 and the docking station 200 which are engaged with each other.

The radio transmission ranges 126A and 218A of the radio signals from the antenna 126 and 218 specific for docking are both limited to several centimeters to several tens of centimeters. FIG. 4 is a top view showing the computer 10 and the docking station 200 which are docked with each other.

In such a manner, in the first example, the antenna 126 for use in radio communication between the computer 10 and the docking station 200 is provided in a position in the computer 10, which is close to the antenna 218 provided in the docking station 200 when the computer 10 is docked with the docking station 200.

When the computer 10 is docked with the docking station 200, radio communication is carried out between them by using the antennas 126 and 218 specific for docking, while limiting the transmission ranges of the radio signals from the antennas 126 and 218. Thus, even if another radio communication device is present in the vicinity of the computer 10, the computer 10 can communicate with the docking station 200 by radio without influencing a radio signal output from the above other radio communication device, i.e., without causing the radio signals from the computer 10 (the antennas 126 and 218 specific for docking) and the other radio communication device to interfere with each other. Thereby, between the computer 10 and the docking station 200, radio communication can be carried out at a high speed and in safety, without wastefully using radio communication channels. In addition, power for the radio communication is small, and wasteful power consumption is not caused.

Figure 5:
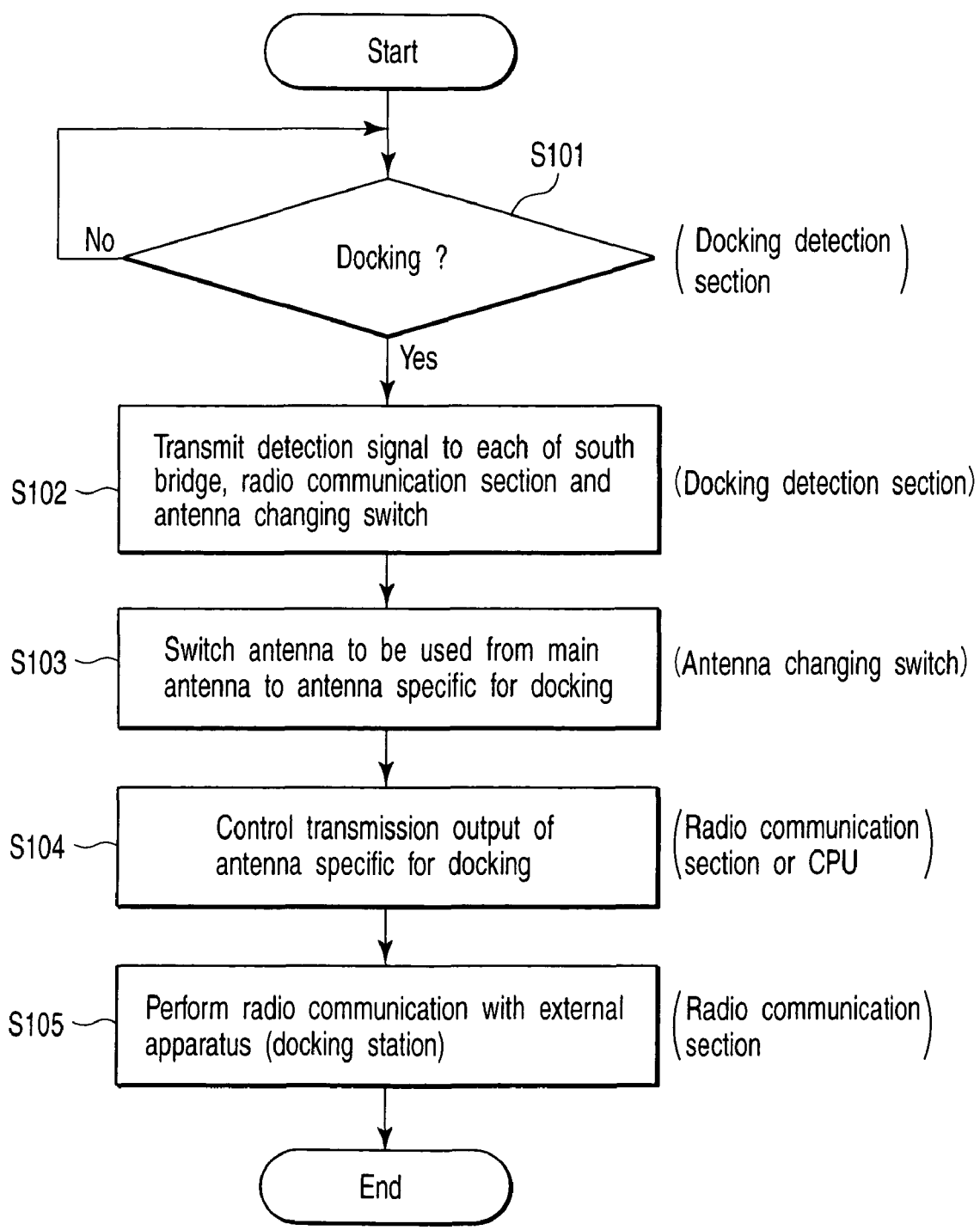
FIG. 5 is a flowchart for use in explaining a first example of the procedure of a radio signal limiting processing to be performed by the information processing apparatus shown in FIG. 1.

Next, a first example of the procedure of the radio signal limiting processing which is performed by the computer 10, in the case where the computer 10 is docked with the docking station 200, will be explained with reference to the flowchart of FIG. 5.

The docking detection section 122 detects whether the computer 10 is docked with the docking station 200 or not, i.e., whether the microswitch 122A is pressed or not (step S101). When the computer 10 is docked with the docking station 200, i.e., the docking detection section 122 detects that the microswitch 122A is pressed (YES in step S101), the docking detection section 122 transmits the detection signal to each of the South bridge 116, the radio communication section 123 and the antenna changing switch 124 (step S102). When receiving the detection signal, the antenna changing switch 124 switches the antenna to be used from the main antenna 125 to the antenna 126 specific for docking (step S103). In the step 103, the antenna changing switch 124 connects the antenna 126 to the radio communication section 123.

The radio communication section 123 limits the transmission output of the antenna 126 specific for docking. That is, the radio communication section 123 supplies power, the amount of which is smaller than that of power to be supplied to the main antenna 125, to the antenna 126 (step S104). It should be noted that in the step S104, the CPU 111 may receive the detection signal through the South bridge 116, and then supply the power smaller in amount than that to the main antenna 125 to the antenna 126. The radio communication section 123 communicates by radio with the docking station 200 by using the antenna 126 (step S105).

Figure 6:
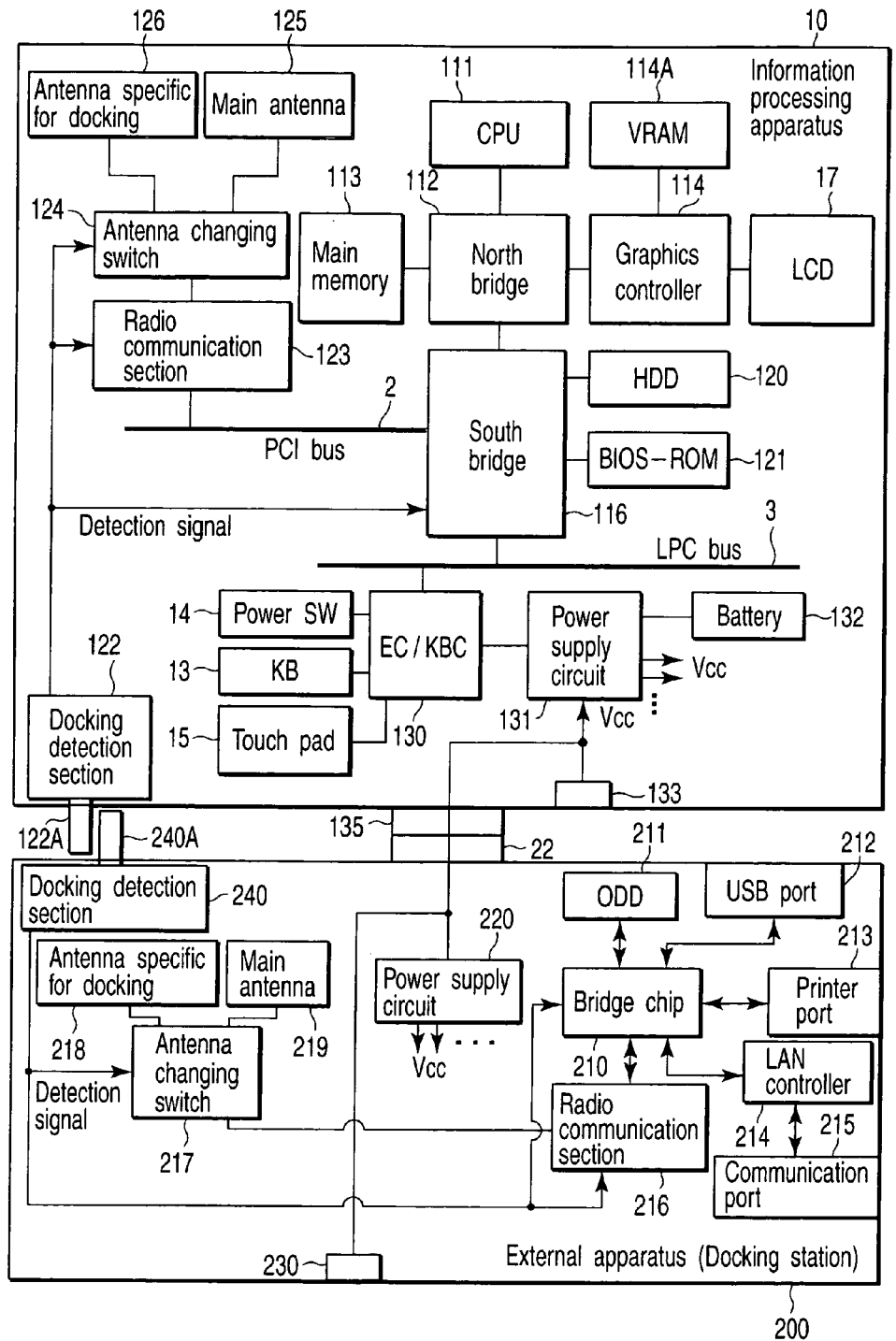
FIG. 6 is a block diagram showing a second example of the system configuration of the information processing apparatus and external apparatus shown in FIG. 1.
Figure 7:
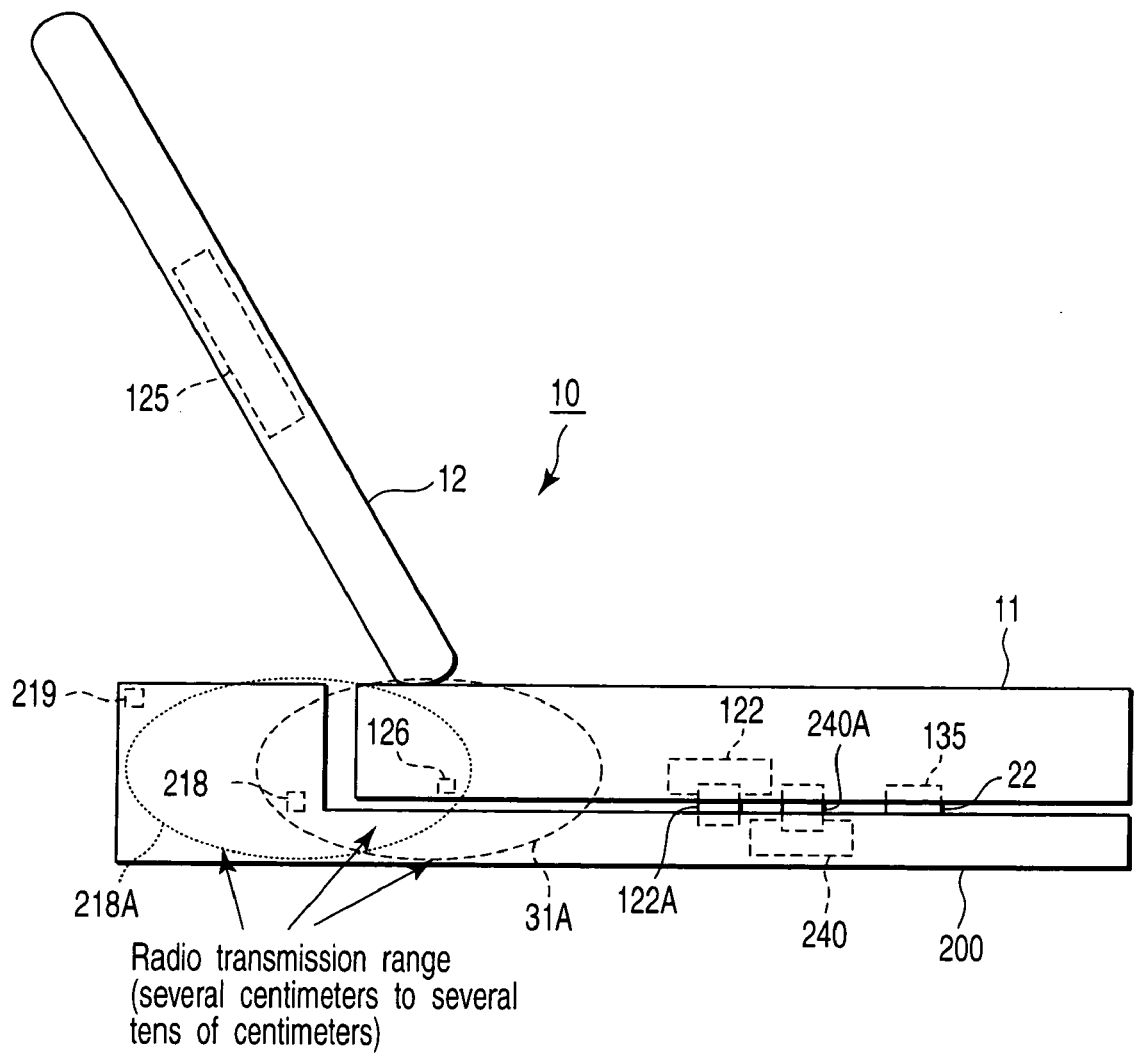
FIG. 7 is a vertical sectional view for use in explaining a second example of the positions of antennas provided in the information processing apparatus and the external apparatus shown in FIG. 6 and the ranges of transmission of radio signals from the antennas.

Next, a second embodiment of the present invention will be explained with reference to FIGS. 6 and 7. FIG. 6 shows a second example of the structure of each of the computer 10 and the docking station 200. In the second embodiment, of the structural elements of the computer 10 and the docking station 200, structural elements identical to those in FIG. 2 will be denoted by the same reference numerals as in FIG. 2, respectively.

According to the second embodiment of the present invention, the docking station 200 includes an antenna changing switch 217, a main antenna 219 and a docking detection section 240, etc., in addition to the structure show in FIG. 2. The antenna changing switch 217 is connected to the radio communication section 216 of the docking station 200.

The radio communication section 216 functions as a radio communication module which communicates by radio with the computer 10 by using the main antenna 219 or the antenna 218 specific for docking. The radio communication section 216 limits the strength (field strength) of the radio signal to be transmitted from the antenna 218, in response to a detection signal transmitted from the docking detection section 240. To be more specific, the radio communication section 216 supplies power the amount of which is smaller than that of power to be supplied to the main antenna 219, to the antenna 218. Thereby, the strength of the radio signal output from the antenna 218 is smaller than that of the radio signal output from the main antenna 219.

The antenna 218 specific for docking and the main antenna 219 are connected to the antenna changing switch 217. The antenna changing switch 217 selectively connects the antenna 218 and the main antenna 219 to the radio communication section 216 in accordance with whether the detection signal is output from the docking detection section 240 or not. To be more specific, when receiving the detection signal from the docking detection section 240, the antenna changing switch 217 connects the antenna 218 to the radio communication section 216. On the other hand, when not receiving the detection signal from the docking detection section 240, the antenna changing switch 217 connects the main antenna 219 to the radio communication section 216.

To the docking detection section 240, for example, a microswitch 240A is connected. The microswitch 240A is provided at an upper surface portion of the docking station 200. The microswitch 240A is pressed when the computer 10 is docked with the docking station 200. As a result, the docking detection section 240 generates the detection signal as a signal indicating that the computer 10 and the docking station 200 have been docked with each other, and transmits the generated detection signal to each of the antenna changing switch 218, the radio communication section 216 and the bridge chip 210. While the microswitch 240A is kept pressed, the docking detection section 240 continuously transmits the detection signal.

In the second embodiment, when the computer 10 is not docked with the docking station 200, radio communication between the computer 10 and the docking station 200 is carried out by using the main antenna 125 of the computer 10 and the main antenna 219 of the docking station 200. On the other hand, when the computer 10 is docked with the docking station 200, radio communication between them is carried out by using the antennas 126 and 218 specific for docking, which are provided in the computer 10 and the docking station 200.

Next, a second example of the positions of the antennas provided in the computer 10 and the docking station 200 will be explained with reference to FIG. 7. FIG. 7 is a side view of each of the computer 10 and the docking station 200 which are docked with each other.

In the second example, the main antenna 125 is provided in the display unit 12 of the computer 10, and the antenna 126 specific for docking is provided in the base portion 11 of the computer 10. At the bottom of the base portion 11, the microswitch 122A and the connector 135 to be connected to the docking interface connector 22 are provided. The antenna 126 of the computer 10 is located in a predetermined position in the base portion 11, which is closer to the antenna 218 provided in the docking station 200 than to the main antenna 125, when the computer 10 is docked with the docking station 200.

In the docking station 200, the antenna 218 specific for docking, the main antenna 219 and the detection section 240 are provided. At the upper surface of the docking station 200, the microswitch 240A is provided to detect docking of the computer 10 and the docking station 200.

When the connector 135 and the docking interface connector 22 are connected to each other, the microswitches 122A and the 240A are pressed. When the microswitch 122A is pressed, the docking detection section 122 of the computer 10 transmits the detection signal to each of the radio communication section 123, the antenna changing switch 124 and the South bridge 116 in the computer 10. When receiving the detection signal, the radio communication section 123 (or the CPU 111) executes the radio signal limiting processing for limiting the strength (field strength) of the radio signal output from the antenna 126 of the computer 10 in such a manner as to limit the range of transmission of the radio signal output from the antenna 126 to the transmission range 126A, i.e., a minimum range in which the radio signal can reach the antenna 218 of the docking station 200.

On the other hand, when the microswitch 240A is pressed, the docking detection section 240 of the docking station 200 transmits the detection signal to each of the radio communication section 216, the antenna changing switch 217 and the bridge chip 210 in the docking station 200. When receiving the detection signal, the antenna changing switch 217 switches the antenna to be applied to radio communication from the main antenna 219 to the antenna 218 specific for docking. Also, when receiving the detection signal, the radio communication section 216 executes a second radio signal limiting processing for limiting the strength (electric field) of the radio signal output from the antenna 218 of the docking station 200 in such a manner as to limit the range of transmission of the radio signal to the transmission range 218A, i.e., a minimum range in which the radio signal can reach the antenna 126 specific for docking in the computer 10.

Furthermore, in the second embodiment, the second radio signal limiting processing is performed by the radio communication section 216; however, for example, it may be done by software such as firmware which is stored in the bridge chip 210.

Figure 8:
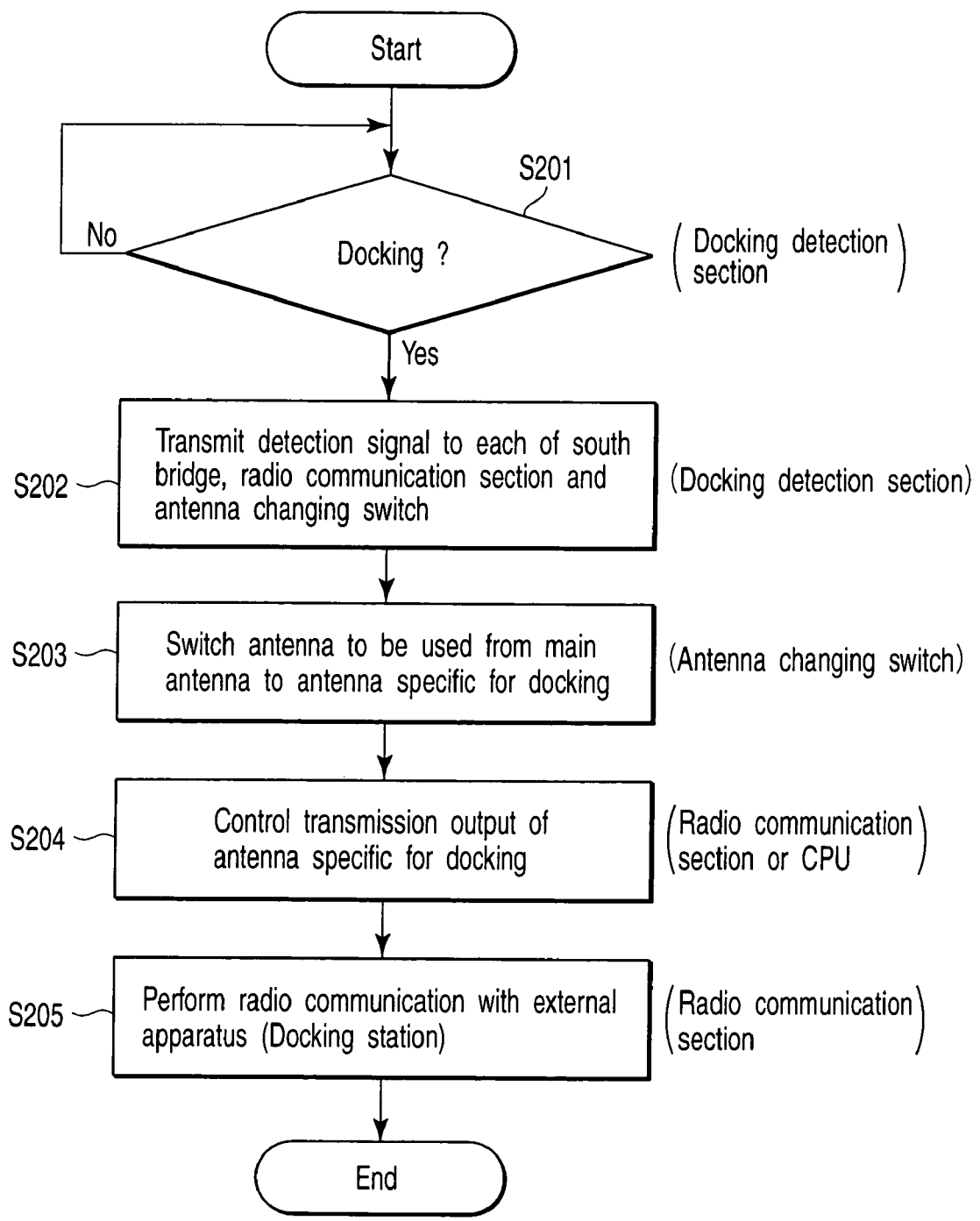
FIG. 8 is a flowchart for use in the procedure of a radio signal limiting processing to be performed by the information processing apparatus shown in FIG. 6.

Next, the procedure of the radio signal limiting processing of the computer 10 in the second example will be explained with reference to the flowchart of FIG. 8.

The docking detection section 122 detects whether the computer 10 is docked with the docking station 200 or not, i.e., the microswitch 122A is pressed or not (step S201). When the computer 10 is docked with the docking station 200; that is, the docking detection section 122 detects that the microswitch 122A is pressed (YES in step S201), the docking detection section 122 transmits the detection signal to each of the South bridge 116, the radio communication section 123 and the antenna changing switch 124 (step S202). When receiving the detection signal, the antenna changing switch 124 switches the antenna to be used from the main antenna 125 to the antenna 126 specific for docking (step S203). In the step S203, the antenna changing switch 124 connects the antenna 126 to the radio communication section 123. The radio communication section 123 limits the transmission output of the antenna 126. To be more specific, the radio communication section 123 supplies power, the amount of which is smaller than that of power to the main antenna 125, to the antenna 126 (step S204). It should be noted that in the step S204, the CPU 111 may execute processing for causing the power smaller in amount than that to the main antenna 125 to be supplied to the antenna 126, when receiving the detection signal through the South bridge 116. The radio communication section 123 communicates with the docking station 200 by radio with the antenna 126 (step S205).

Figure 9:
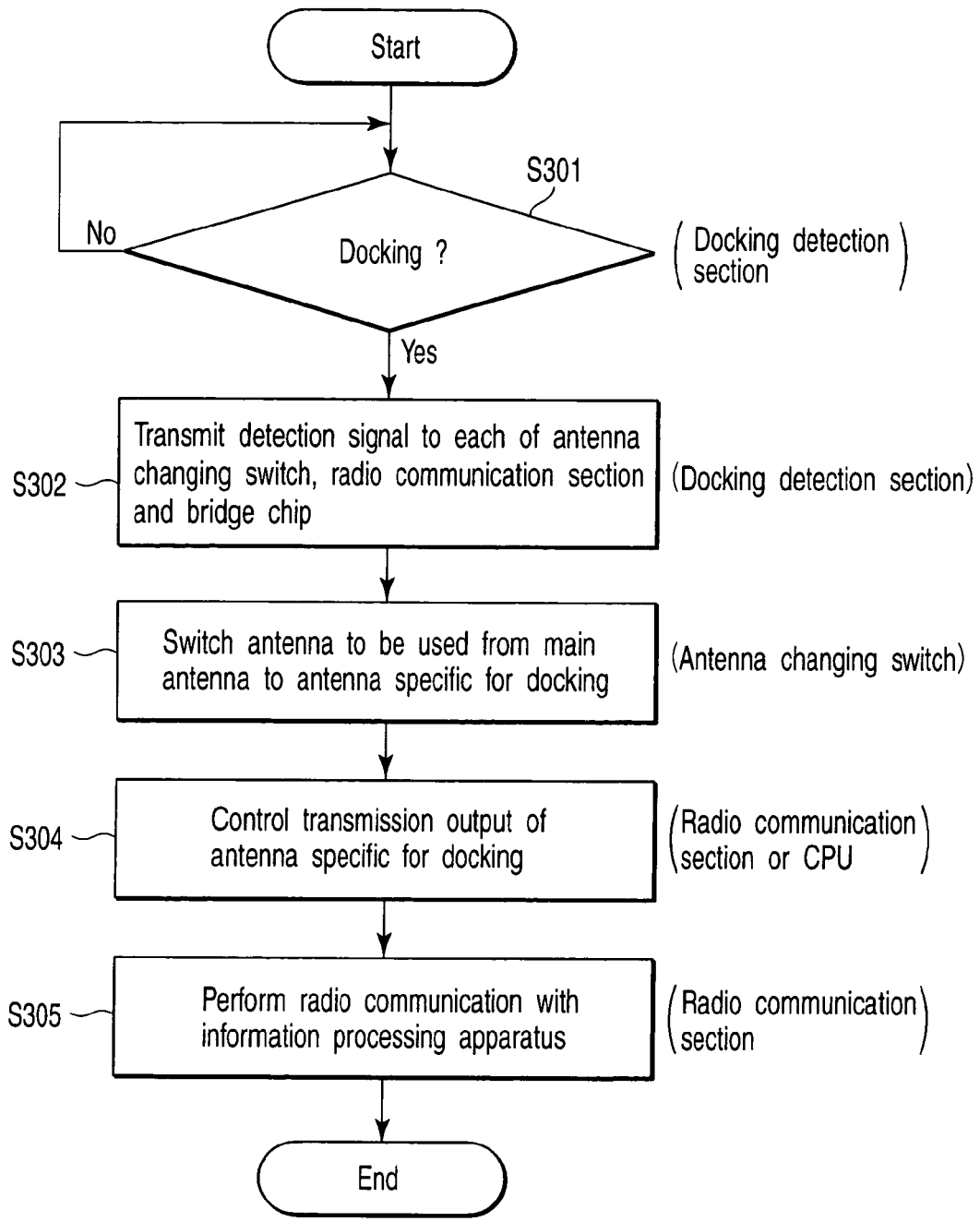
FIG. 9 is a flowchart for use in an example of a radio signal limiting processing to be performed by the external apparatus shown in FIG. 6.

Next, an example of the procedure of the second radio signal limiting processing of the docking station 200 in the second example will be explained with reference to the flowchart of FIG. 9.

The docking detection section 240 of the docking station 200 detects whether the computer 10 is docked with the docking station 200 or not; that is, it detects whether the microswitch 240A is pressed or not (step S301). When the computer 10 is docked with the docking station 200, i.e., the docking detection section 240 detects that the microswitch 240A is pressed (YES in step S301), the docking detection section 240 transmits the detection signal to each of the antenna changing switch 217, the radio communication section 216 and the bridge chip 210 (step S302). When receiving the detection signal, the antenna changing switch 217 switches the antenna to be used from the main antenna 219 to the antenna 218 specific for docking (step S303). In the step S303, the antenna changing switch 217 connects the antenna 218 to the radio communication section 216. The radio communication section 216 controls the transmission output of the antenna 218. To be more specific, the radio communication section 216 supplies power, the amount of which is smaller than that of power to the main antenna 219, to the antenna 218 (step 304). The radio communication section 216 communicates with the docking station 200 by radio with the antenna 218 (step S305).

In such a manner, in the second embodiment, the antenna 126 specific for docking is provided in the predetermined position in the computer 10, which is closer to the antenna 218 provided in the docking station 200 than to the main antenna 125 in the computer 10, when the computer 10 is docked with the docking station 200. Furthermore, when the computer 10 and an external apparatus incorporating an antenna specific for communication with the computer 10 are docked with each other, the computer 10 switches the antenna to be used from the main antenna 125 to the antenna 126 specific for docking, and controls power to be supplied to the antenna 126 such that the amount of the power is smaller than that of power to the main antenna 125. Therefore, radio communication can be carried out without wastefully consuming power, without wastefully using communication channels, and without being influenced by an unnecessary external radio wave.

As described above, the second embodiment is explained by referring to the case where the processing for limiting the transmission range of the radio signal is executed. However, the strengths of the radio signals output from the antennas 126 and 218 specific for docking may be limited to be smaller than those of the radio signals from the main antennas 125 and 217 by forming the elements of the antennas 126 and 218 such that they are smaller than those of the main antennas 125 and 217.

Furthermore, the second embodiment is also explained by referring to the case where the processing for limiting the transmission range of the radio signal is executed by the radio communication section 123. However, for example, it may be executed by software for controlling the operation of the radio communication section 123 under the control of the CPU 111.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing system comprising:
   first and second components configured to detachably connect to each other;
   a first antenna in the first component and a second antenna in the second component, the antennas configured to communicate with each other, said antennas being positioned on said first and second components, respectively, so that they are positioned proximate to each other when the first and second components are connected; and
   a switch in the first component configured to activate the first antenna to communicate with the second antenna when the first and second components are connected, wherein the switch is configured to switch activation from a third antenna in the first component to the first antenna.

2. The information processing system according to claim 1, further comprising a radio communication unit in the first component configured to control the strength of a radio signal output from the first antenna relative to that from the third antenna.

3. The information processing system according to claim 1, further comprising a second switch in the second component configured to activate the second antenna to communicate with the first antenna when the first and second components are connected.

4. An information processing apparatus comprising:
a main body that is detachably connected to an external unit, the main body comprising a first antenna configured to provide radio communication;
a second antenna provided in the external unit;
a third antenna provided in a predetermined position in the main body, the third antenna being positioned closer to the second antenna than to the first antenna when the main body is connected to the external unit; and
a switch in the main body configured to activate the third antenna to communicate with the second antenna when the main body is connected to the external unit.

5. The information processing apparatus according to claim 4, further comprising a radio communication unit that is connected with the second antenna and the third antenna, the radio communication unit configured to control the strength of a radio signal output from the third antenna relative to that from the first antenna.

6. The information processing apparatus according to claim 4, further comprising a connector provided at the main body to permit connection of said main body with the external unit for receiving power from external unit.

7. A radio communication control method for an information processing apparatus provided with a main body to be detachably connectable to an external unit including a first antenna, the radio communication control method comprising:
determining whether the main body is connected to the external unit;
permitting radio communication between the main body and the external unit via a second antenna provided in said main body when the main body is not connected with the external unit; and
permitting radio communication between the main body and the external unit via a third antenna when the main body is connected with the external apparatus.

8. The radio communication control method according to claim 7, further comprising controlling the strength of a radio signal transmitted using the third antenna relative to that using the second antenna.

* * * * *